United States Patent [19]

Portier

[11] Patent Number: 4,859,594
[45] Date of Patent: Aug. 22, 1989

[54] MICROORGANISMS FOR BIODEGRADING TOXIC CHEMICALS

[75] Inventor: Ralph J. Portier, Baton Rouge, La.

[73] Assignee: Louisana State University Board of Supervisors, Louisana State University, Baton Rouge, La.

[21] Appl. No.: 918,840

[22] Filed: Oct. 14, 1986

[51] Int. Cl.$^4$ .................... C12N 15/00; C12N 11/00; C12N 1/36; C12N 1/20

[52] U.S. Cl. ................... 435/172.1; 210/601; 435/174; 435/176; 435/177; 435/178; 435/179; 435/244; 435/245; 435/252.1; 435/252.3; 435/252.34; 435/253.3; 435/262; 435/858; 435/874; 435/876

[58] Field of Search ............... 435/174, 176, 177, 178, 435/179, 244, 245, 253, 262, 858, 874, 876, 172.1, 252.1, 252.3, 252.34, 253.3; 210/601

[56] References Cited

U.S. PATENT DOCUMENTS

| | | | |
|---|---|---|---|
| 4,153,510 | 5/1979 | Messing et al. ..................... | 435/176 |
| 4,391,887 | 7/1983 | Baumgarten et al. .......... | 435/245 X |
| 4,452,894 | 6/1984 | Olsen et al. .......... | 435/253 |
| 4,477,570 | 10/1984 | Colarutolo et al. ............. | 435/253 |
| 4,483,923 | 11/1984 | Blair .......... | 435/876 X |
| 4,681,851 | 7/1987 | Baumgarten et al. .......... | 435/262 |
| 4,713,340 | 12/1987 | Crawford .......... | 435/262 X |

*Primary Examiner*—David M. Naff
*Attorney, Agent, or Firm*—Llewellyn A. Proctor

[57] ABSTRACT

This invention relates to novel microorganisms separated from natural environments and purified and genetically modified, process for immobilizing these microorganisms by affixing then to substrates, the biocatalytic compositions formed by these microorganisms affixed to substrates, and the use of the biocatalytic compositions for the detoxification of toxin-polluted streams. The microorganisms are (1) *Pseudomonas fluorescens* (ATCC SD 904); (2) *Pseudomonas fluorescens* (ATCC SD 903); (3) *Pseudomonas cepacia* (ATCC SD 905); (4) *Methylobacter rhodinum (ATCC 113-X)*; and (5) *Methylobacter* species (ATCC 16 138-X).

9 Claims, No Drawings

MICROORGANISMS FOR BIODEGRADING TOXIC CHEMICALS

This invention was made with Government support under Grant NA81AA-D-00103 awarded by the National Oceanic And Atmospheric Association, U.S. Department of Commerce. The Government has certain rights in this invention.

FIELD OF THE INVENTION

This invention relates to novel microorganisms, to a process for immobilizing and affixing these microorganisms to substrates for use as biocatalysts, to the novel biocatalyst compositions so produced, and to the use of the novel biocatalyst compositions for conducting chemical reactions, especially for the detoxification of toxin-polluted streams.

BACKGROUND AND PROBLEMS

The use of a wide variety of toxic chemicals in agriculture has presented recognizable problems, as well as potential hazards in terms of land use, and extant danger to wetland systems. Moreover, an array of toxic chemicals are discharged from diverse industrial facilities, these including accidental spills and the creation of dump areas which form a continuing source of pollution. These discharges, spills and dump sites create direct hazards to the use of land, and have caused serious drinking water contamination, and other health problems. Often these chemicals find their way into wetlands systems. For example, the coastal zone of Louisiana contains an ecosystem of more than seven million acres of marshes and estuaries representing approximately 40 percent of the total coastal wetland area of the lower forty-eight states of the United States. The gulfward movement of water introduces a wide variety of organic materials, including potentially hazard chemicals, into highly productive shrimp nursery grounds. The widespread use over the last several decades of herbicides, pesticides, and other chemicals in this geographical area has raised serious questions concerning the effect of these chemicals on the environment. Such toxic agents as, e.g., organo phosphates, organochlorides, polychlorobiphenyls (PCB's), polynuclear aromatic hydrocarbons (PAH's) and chlorinated phenols have been noted for their recalcitrant nature and the relative difficulty of establishing adapted microbial populations to effectively biotransform and biodegrade these materials within an acceptable time frame.

Large volumes of process waters, containing a changing organic chemical matrix of these and other toxic contaminants, are discharged by industrial plants located in this area following biological oxidation in aerated lagoons and/or activated sludge systems. Such aerobic systems have the ability to reduce the total BOD and COD of the effluents but are subject to upsets due to shifting effluent load from one toxicant class to another. It has been deemed advantageous to apply enzymes to the treatment of these systems since enzymes are biocatalytic materials which possess extraordinary high efficiency, have specific properties, and can be used to catalyze almost any chemical reaction, without producing harmful substances. Industrial applications of enzymes or microorganisms have been accomplished by using intact microorganisms or soluble enzyme preparations. It has been recognized that the immobilization of the catalyst offers a means of stabilizing the enzymes and microorganisms for subsequent recovery without inactivation. Whereas most immobilization studies are concerned with cell-free enzymes, more recently attention has been directed toward the use of immobilized whole microbial cells. Use of the whole microbial cell obviates the need for cell separation, enzyme extraction, and enzyme purification steps prior to immobilization.

Methods have been described in the literature for the immobilization of enzymes, microbial cells, plant cells and animal cells. In general, such methods have been classified as cross-linking, entraping and carrier-binding. The cross-linking method is based on the formation of chemical bonds, the immobilization of the enzymes or cells being accomplished by the formation of intermolecular cross-linkages between the enzyme molecules or the cells, by means of bifunctional or multifunctional reagents. Cross-linking reagents have included such compounds as glutaraldeyde, bisisoocyanate derivative and bisdiazobenzidine.

The entrapping method is based on a technique of confining the enzymes or cells in the lattice of a polymer matrix, or enclosing them in semipermeable membranes. The enzyme or cell itself is not physically bound to the gel matrix or membrane.

In the carrier binding method, the binding mode of which includes physical adsorption, ionic binding and covalent binding, the enzymes or cells are linked directly to water-insoluble carriers, e.g., polysaccharides (cellulose, dextron, and agarose derivatives), proteins (gelatin and albumin), synthetic polymers (ion-exchange resin and polyvinylchloride), and inorganic materials (brick, sand and glass). For the immobilization of cells the method has not been considered advantageous because leakage of the enzymes may readily occur due to autolysis during the enzyme reaction. In the covalent method of carrier-binding immobilization is carried out under more severe conditions than in the physical binding method, and accordingly conformational changes and partial destruction of the active center may occur. Often therefore immobilized enzymes having high activity are not obtained, or if obtained the activity decreases during long term operation and regeneration is not possible. With ionic binding immobilization of the enzymes can be achieved under relatively mild conditions, and accordingly relatively high activity is generally obtained. However, the binding forces between the enzyme and carrier are weak and changes in ionic strength, pH of the substrate or product solution can result in leakage in the enzyme from the mass.

OBJECTS

It is, accordingly, the primary objective of the present invention to overcome these and other disadvantages by providing novel microorganisms, process for the immobilization and attachment of these and other microorganisms to a carrier, or support, to form a biocatalyst, and process for the passage of a chemical-containing effluent stream through a bed of said catalyst to conduct biochemical reactions.

A further, and more specific object is to provide novel microorganisms on immobilizing solid supports suitable for conducting continuous biochemical reactions, especially low energy biochemical reactions useful for the detoxification of toxic chemical-containing effluents brought into contact therewith at high detoxification rates.

A more specific object is to provide novel microorganisms, and biocatalyst compositions produced from such organisms which can effectively biotransform and biodegrade a wide class of toxicants within an acceptable time frame.

THE INVENTION

These objects and others are achieved in accordance with the present invention comprised of microorganisms, isolated from natural environments, purified and genetically modified, to provide novel microbial strains. These and other novel microbial strains or the enzyme fractions thereof can be immobilized by bonding same to porous water-insoluble solid adsorbents to form biocatalytic compositions which, when used as biocatalyst beds, can be contacted with toxic effluent streams for the detoxification thereof.

The novel microorganisms of this invention are characterized as (1) *Pseudomonas fluorescens* Ppr S-4-1 (ATCC SD 904); (2) *Pseudomonas fluorescens* Chemostat 5 1/2 mo (ATCC SD 903); (3) *Pseudomonas cepacia* Sys 2-A (ATCC SD 905); (4) *Methylobacter rhodinum* SC 971-Red (ATCC 113-X); and (5) Methylobacter species SC 971-White (ATCC 138-X) [Bergy's Manual of Systematic Bactoriology, Vol. 1, Krieg and Holt, Williams & Williams Baltimore, Md., U.S.A. and London, England (1984).]

Each can be identified by reference to Tables 1 and 2, respectively, as follows:

TABLE 1

| | Pseudomonas fluorescens, PPr S-4-1 (ATCC SD 904) | Pseudomonas fluorescens, Chemostat 5½ mo (ATCC SD 903) | Pseudomonas cepacia, Svs 2-A (ATCC SD 905) |
|---|---|---|---|
| Gram reaction | − | − | − |
| shape | rod | rod | rod |
| ONPG (B—galactosidase) | − | − | − |
| arginine dihydrolase | + | + | − |
| lysine decarboxylase | − | − | − |
| ornithine decarboxylase | − | − | − |
| citrate utilization | + | + | + |
| H$_2$S production | − | − | − |
| urease | − | − | − |
| tryptophan deaminase | − | − | − |
| indol production | − | − | − |
| Voges-Proskauer | − | − | − |
| gelatinase | + | + | − |
| acid from: | | | |
| glucose | − | − | + |
| mannitol | − | − | − |
| inositol | − | − | − |
| sorbitol | − | − | − |
| rhamnose | − | − | − |
| sucrose | − | − | − |
| melibiose | − | − | − |
| amygdalin | − | − | − |
| arabinose | − | − | − |
| cytochrome oxidase | + | + | + |

TABLE 2

| Physiology & Biochemistry: | Methylobacter rhodinum SC 971-Red (ATCC 113-X)[2] | Methylobacter species SC 971-White (ATCC 138-X)[3] |
|---|---|---|
| motility | + | − |
| 4 C growth | − | − |
| 25 C growth | + | + |
| 30 C growth | + | + |
| 37 C growth | − | w |
| 41 C growth | − | − |
| Pigment diffusible | − | − |
| Pigment non-diffusible | + | − |
| Pigment color | pink | − |
| Pyocyanine produced | − | − |
| Fluorescein produced | − | − |
| Melanin pigment produced | − | − |
| pH 6.0 growth | + | + |
| 3% NaCl growth | − | − |
| 6.5% NaCl growth | − | − |
| MacConkey agar growth | − | + |
| Skim milk agar growth | + | + |
| Casein hydrolysis | − | − |
| Starch hydrolysis | − | − |
| Gelatinase | − | − |
| Tween 20 hydrolysis | + | − |
| Tween 80 hydrolysis | − | − |
| Indole | − | − |
| Simmons citrate growth | + | − |
| Urease | + | + |
| Nitrate to nitrite | − | − |
| Nitrite reduction | − | − |
| Nitrite to nitrogen gas | − | − |
| Hydrogen sulfide (TSI) | − | − |
| Lysine decarboxylase | − | − |
| Arginine (Mollers) | − | − |
| Ornithine decarboxylase | − | − |
| Lecithinase | − | − |
| Catalase | + | v |
| Oxidase | w | w |
| Growth on malonate as SCS | + | − |
| Tyrosine degradation | − | − |
| Growth on 0.05% cetrimide | − | − |
| Growth on acetate as SCS | − | − |
| Testosterone degradation | − | − |
| PHB accumulation | + | + |
| Aesculin Hydrolysis | − | − |
| Arginine Hydrolysis | − | − |
| Phenylalanine deamination | − | − |
| dl-hydroxybutyrate | − | − |

TABLE 2-continued

| Physiology & Biochemistry: | Methylobacter rhodinum SC 971-Red (ATCC 113-X)[2] | Methylobacter species SC 971-White (ATCC 138-X)[3] |
|---|---|---|
| 3-ketolactose from lactose | − | − |

Note:
w = slow and weak;
ND = no data;
v = variable one tube weak one tube −

| Sole Carbon Sources in Stanier's Mineral Base: | | |
|---|---|---|
| L-arabinose | − | − |
| cellobiose | − | − |
| D-fructose | + | − |
| D-glucose | − | − |
| lactose | − | − |
| maltose | − | − |
| D-mannitol | − | − |
| L-rhamnose | − | − |
| D-ribose | − | + |
| D-sorbitol | − | − |
| sucrose | − | − |
| trehalose | − | − |
| D-xylose | − | + |
| adonitol | − | − |
| erythritol | − | − |
| glycerol | + | − |
| ethanol | + | − |
| geraniol | − | − |
| i-inositol | − | − |
| sebacic acid | + | − |
| acetamide | − | − |
| adipate | − | − |
| benzoate | − | − |
| butyrate | − | − |
| citraconate | + | − |
| D-gluconate | + | + |
| M—hydroxybenzoate | − | − |
| 2-ketogluconate | − | + |
| DL-lactate | + | + |
| malate | + | + |
| pelargonate | − | − |
| propionate | − | − |
| quinate | − | + |
| succinate | + | + |
| L-+-tartrate | − | − |
| valerate | − | − |
| B—alanine | − | − |
| D-A—alanine | − | + |
| betaine | − | − |
| glycine | − | − |
| L-histidine | − | + |
| DL-norleucine | − | − |
| L-proline | − | w |
| D-tryptophan | − | − |
| L-valine | − | − |
| DL-arginine | − | − |
| benzylamine | − | − |
| butylamine | − | − |
| putrescine | − | − |
| mesoconate | − | − |
| DL-glycerate | + | + |
| L-tryptophan | − | + |
| Methanol | + | + |

| Fermentation of Carbohydrates: in Hugh & Leifson's O-F Medium | | |
|---|---|---|
| Acid from L-arabinose | + | w |
| Acid from cellobiose | − | K |
| Acid from ethanol | + | + |
| Acid from D-fructose | + | K |
| Acid from D-glucose AO2 | − | K |
| Acid from D-glucose AnO2 | − | − |
| Alkaline pH in D-glucose | + | + |
| Acid from glycerol | + | K |
| Acid from i-inositol | − | K |
| Acid from lactose | − | K |
| Acid from maltose | − | K |
| Acid from D-mannitol | − | K |
| Acid from D-mannose | − | K |
| Acid from L-rhamnose | − | w |
| Acid from D-ribose | + | w |
| Acid from sucrose | − | K |
| Acid from trehalose | − | K |
| Acid from D-xylose | + | w |
| control | K | K |

Note 1:
w — weak positive; + = acid; − = no change; K = alkaline

Note 2:
Cells are non-spore forming gram negative rods. Cells are large and vacular, with one to three polar, sub-polar, or lateral flagella. Colonies are entire, smooth and pink. Growth is slow and sparse on Nutrient agar, Trypticase soy agar and Brain-Heart Infusion agar. Growth is much better on Pseudomonas F agar, the isolate produces shiny colonies.

Note 3:
Cells are non-spore forming gram negative rods. Cells are very short fat rods. Motility is absent. Colonies are smooth entire, white and slow growing on Nutrient agar. On Brain-Heart Infusion agar colonies become glistening and mucoid.

The *Pseudomonas fluorescens* Pr S-4-1 (ATCC SD 904) was obtained from a field sample of a sediment taken from Capital Lake, a fresh water lake in Baton Rouge, Louisiana, at a temperature of 23° C. The sediment was heavily contaminated with PCB's. The *Pseudomonas fluorescens* Chemostat 5 ½ mo (ATCC SD 903) was isolated from a field sample of sediment obtained from an abandoned waste site in Ascension Parish, near Darrow, Louisiana, heavily contaminated by chlorinated ethanes. The *Pseudomonas cepacia* Sys 2-A (ATCC SD 905) was isolated from a field sample of a sediment obtained at Shell Beach, Louisiana, a Mississippi River Gulf outlet. The sediment was heavily contaminated with polychlorophenols (PCP's), had a salinity of 12 ppm, and was obtained at 18° C. The Methylobacter cultures, i.e., *Methylobacter rhodinum* SC 971-Red (ATCC 113-X) and *Methylobacter species* SC 971-White (ATCC 138-X), were isolated from activated charcoal taken from a commercial waste treatment unit at St. Gabriel, Louisiana. The activated charcoal was heavily contaminated with Triazines, the Triazine herbicide being one of the herbicides most commonly used in American agriculture. Triazines are of a recalcitrant nature and are not successfully degraded by conventional waste treatment processes. A field sample of each of the five specimens was treated in the laboratory, continuous flow microcosms of each being formed and treated as follows:

(a.) PCBs (polychlorinated biphenyls): 5 ppm; same as PCP; final conc: 50 ppm of either Aroclor 1232, 1242, 1248, 1254, 1260, or specific congenors/isomers of each. Total time: 3 mos. Cultures maintained on 200 ppm PCB agar.

(b.) CHLORINATED ETHANES: 50 ppm 1,1 or 1,2 dichloroethane; final conc. 2.0 ppt mixed chlor ethanes, primarily 1,2 dichloroethane. same as PCP; Total time: 9 weeks. Cultures maintained on 500 ppm chlor ethane (either 1,1 or 1,2 dichloroethane).

(c.) (polychlorinated phenols): 10 ppm 0.21 ml/min increase to 1.8 ml/min (50 ppm solutions) under continuous low level UV. aeration. Confirmed by radiotracer c14 Total time: 6 weeks. Cultures maintained on 200 ppm PCP agar.

(d.) Triazines: 50 ppm atrazine, simazinefinal conc. 12 ppm. Total time: 1,240 hrs. Cultures maintained on 50 ppm triazine (either simazine or atrazine), Flow rate =0.21 ml/min increase to 1.0 ppm.

Each of these microorganisms, viz., (1), (2), (3), (4) and (5) respectively, were affixed to surfaces characterized as chitin, chitosan, cellulose, diatomaceous earth, porous inorganic oxides, e.g., alumina, and the like.

A culture of each microorganism has been deposited in the American Type Culture Collection at Rockville, Maryland and each culture assigned an identifying number, each as previously identified, this depository affording permanence of the deposit and ready accessibility thereto by the public on grant of a patent, and under conditions which assure (a) that access to the culture will be available during pendency of the patent application to one determined to entitled thereto under 37 CFR 1.14 and 35 USC 122, and (b) that all restrictions on the availability to the public of the culture so deposited will be irrevocably removed upon grant of a patent.

Progenitors of the microorganisms of this invention or others are selected from a soil, sediment, or stream enriched by accidental, purposeful or deliberate treatment with the toxicant for which the cultured genetically modified immobilized microorganism of this invention is to be used as a biocatalytic detoxicant. Thus, e.g., a progenitor microoganism which is to be cultured, genetically modified and immobilized upon a substrate for use in detoxifying streams which contain pentachlorophenol (PCP), is selected from a soil, sediment, or stream which has been heavily contaminated with PCP's, by accidental previous spillage(s) or deliberate treatments with PCP. If, on the other hand, e.g., a microorganism is desired for use in the detoxification of PCB (polychlorobiphenyls)-containing streams, then the progenitor microorganism is isolated from a soil, sediment, or stream heavily contaminated with PCB's. The contaminated soil, sediment, or stream from the field environment, containing the progenitor microorganism is natural in all respects except arguably for the presence of the toxicant, or contaminant. It is placed in a microcosm which simulates, or duplicates to the fullest extent possible, except for the level of concentration of the toxicant itself, the conditions of the environment from which it was taken, viz., as regards pH, temperature, water composition, salinity, etc. The level of the toxicant maintained within the simulated environment, while initially not excessive of that of the sediment from which the specimen was taken, is gradually or incrementally increased. Observations are periodically, or continuously made of the microcosm to detect the different strains of microorganisms which survive these treatments, and the most hardy of these cultures are selected and grown on an agar surface which contains the same toxicant as the sole carbon source. Simultaneously, the agar surface is treated with a mutagen, or mutagens, to kill and destroy the least hardy of the microorganisms. Some survive; most do not. This procedure is repetitively, conveniently carried carried out with conventional mutagens, e.g., ultra-violet, or mutagenic chemical agents such as ethidium bromide, novobiocin, sodium dodecyl sulfate (SDS) or the like, suitably upon gradient plates to progressively eliminate, destroy or kill the least hardy specimens. Colonies of the selected specimens, i.e., the microoganisms of this invention, are concentrated and collected in this manner as pure, or essentially pure cultures.

The now essentially pure, or sterile, cultures of a microorganism of this invention are now again placed in a microcosm and subjected to the same stress variables, or conditions found in the natural, or field environment from which they, in admixture with other microorganisms, were originally taken with the exception that the sterile cultures are again subjected to treatment with progressively increasing concentrations of the selected toxicant. In the microcosm, the toxicant is substituted for the more conventional carbon source, and may be made eventually the sole carbon source for the microorganism. Preferably, the concentration of the toxicant is increased to a level at least approximately equal to, and greater than that of the toxicant in the toxin-containing stream which is to be treated by the immobilized microorganism. The pH, temperature, water composition, salinity and the like, are maintained at essentially the same levels as in the environment from which the field sample was obtained. Nitrogen phosphorus and minerals from a suitable source, as known desirable for the growth of healthy microorganisms, are added to the microcosm. The microorganisms of this invention are faculative anaerobes. They do not require oxygen, and hence oxygen need not be added to the microcosm to sustain healthy reproduction and growth.

The pure microorganism cultures of this invention are in effect treated within the microcosm in an environment which simulates long term reproduction, and growth of the colonies. The microorganism adapts to the toxicant to which it is exposed and assimilates it as a preferential source of carbon. This type of environmental adaptation simulates generally many years of reproduction, adaptation and growth by the microorganism. The progenitor microorganism is genetically modified by such adaptation, and it becomes increasingly resistant to destruction and harm from the toxicant to which it is in constant exposure, and indeed becomes able to thrive on this new carbon source. Cultures of the genetically modified microorganism are subsequently separated from the microcosm, suitably by filtration. The microorganism, or another similarly obtained from a soil, sediment or stream, is then immobilized by attachment to a suitable substrate.

A microorganism of this invention, or another similarly obtained from a soil, sediment or stream, is immobilized upon a solid surface, or substrate to form a catalytic, or biocatalytic composition. This is accomplished generally by either of two procedures: (1) a substrate is first treated, impregnated, or coated with a solution which constitutes a carbon source, or additional carbon source where some carbon may be supplied by the substrate, and the microorganism is then brought in contact with the pretreated surface, or surface containing the added carbon source, or (2) the substrate is treated simultaneously with a solution of the carbon source and the microorganism, as by treatment of the substrate with an admixture of the carbon source and the microorganism. In either method, ingredients other than carbon needed for the growth of healthy microorganisms are added to the substrate by contact thereof with a solution containing the required nutrients, e.g., source of nitrogen, phosphorus and selected minerals as salts. Simultaneously also, in either method, the toxicant for which the microorganism has been grown for use as a detoxicant and on which the microorganism has learned to thrive as a co-carbon source is added to the treated substrate. As the microorganism reproduces and grows within the pores of the substrate it mats therewith and becomes tightly affixed, and bound thereto, becoming thereby immobilized upon the substrate. As this occurs the concentration of the toxicant co-carbon source can be gradually or incrementally increased, and finally completely substituted for the original carbon source applied during the immobilization procedure.

The biocatalyst thus formed by attachment to a substrate of a purified, genetically modified microorganism of this invention, or another similarly obtained from a soil, sediment or stream, having been deprived from normal carbon sources, and forced to accept and in fact thrive on a specific toxin as a substitute carbon-source, can now be employed as a particulate biocatalytic mass for use in the detoxification of streams polluted with similar toxins. For example, a biocatalyst of this invention wherein the progenitor microorganism was obtained from a natural sediment contaminated with, e.g., PCB's, the progenitor microorganism cultivated in the presence of a mutagenic agent an increasing concentration of PCB's as a substitute carbon source to produce a purified, genetically modified microorganism of this invention, and this microorganism then affixed to a substrate to form said biocatalyst, can be used for the detoxification of PCB-containing streams. A biocatalyst of this invention wherein the progenitor microorganism was obtained from a natural sediment or material contaminated with, e.g., triazine, the progenitor microorganism cultivated in the presence of a mutagenic agent an increased concentration of triazine as a substitute carbon source to produce a purified, genetically modified microorganism of this invention, and this microorganism then affixed to a substrate to form said biocatalyst, can be used for the detoxification of triazine-containing streams. The new mutant microorganisms are thus developed from progenitor microorganisms which are deprived of the normal sources of carbon, and forced to take the carbon needed for their nutrition and energy from toxins. A mutant microorganism of this invention, thus bred on a certain type of toxin, "learns" to accept and thrive on this toxin as its carbon source and, after having been affixed to a support, can effectively biotransform and biodegrade within an acceptable time period the toxin of a stream containing this toxin when the stream is contacted therewith.

A biocatalyst formed from a purified, genetically modified microorganism of this invention, or another similarly obtained, can, e.g., be charged as a particulate mass into a tubular vessel and retained or packed therein as a bed. A microorganism separated, cultivated and obtained from a sediment contaminated with, e.g., pentachlorophenol, PCP, can be affixed upon a substrate to form the biocatalytic composition, and the biocatalyst used for the detoxification of a PCP-containing effluent.

The invention, and its principle and mode of operation will be more fully understood by reference to the following examples presenting data illustrating its more salient features. All parts are given in terms of weight except as otherwise expressed.

EXAMPLES 1-5

Certain progenitor Pseudomonas and Methylobacter microorganism species of this invention were isolated from toxic-contaminated sediments from various Louisiana locations, as identified in Table 3 below, and colonized in an agar medium by subjecting an initially mixed microbial population from said source to ever increasing concentrations of a toxicant similar to that found in said contaminated sediment, in the presence of U.V. radiation as a mutating agent. Each of the microorganism strains were then repeatedly isolated after treatments at increasingly elevated toxicant levels, and exposure to U.V. radiation, during which the microorganisms species of this invention thrived, and grew as other microorganisms were killed.

Cultures of the microorganisms of this invention were then further colonized in a minimal salt solution broth containing the toxin. The minimal salts contained in the broth, in g/L of distilled water: $MgSO_4$, 10.0 g; $FeSO_4 \cdot 7H_2O$ 0.5 g; $K_2HPO_4$, 25.0 g; $KH_2PO_4$, 15.0 g; $NH_4Cl$, 27.7 g. The minimal salt solution was sterilized by autoclaving, the toxin was filter sterilized and aseptically added to the sterile broth, and the microbial strain was grown on a rotary platform shaker in the minimal salt solution broth containing 0.1% of the toxin. Residual and insoluble toxin components were removed by filtration, and the cells were resuspended in a 0.025 $MPO_4$ buffer (pH 7.0) solution. Cells were harvested as biologically pure cultures from the late exponential growth phase by centrifugation at 10,000 xg for 10 minutes.

The cultivated biologically pure microorganism was then attached to a substrate, and thereby immobilized to form a biocatalytic composition. Various substrates were employed some of which inherently contained a source of carbon, and others to which a carbon source was added prior to or at the time the microorganism was affixed thereto. A preferred substrate is chitin or chitosan, an aminopolysaccharide. In producing these data, chitosan was employed as a component of a substrate, chitosan having been derived from the fresh water crayfish *Procambarus clarkii* by removal of the chitinous exoskeleton. The chitinous exoskeleton was dried at 60° C. for 24 hours, then solubilized and dispersed on Celite particles. The Celite particles of chitosan was first pretreated with solution of the microbe in said previously described minimal salt solution containing the required growth factors, and 0.1% of the toxin, the microorganism attaching to the Celite-chitosan substrate to form a microbial mat comprising a biologically pure culture of the cultivated microorganism. The bed of chitinous substrate to which the microorganism attached was flushed from time to time to remove non-attached microorganisms, and the concentration of the toxin in the minimal salt solution broth with which the cultivated microorganism was maintained in contact was gradually increased from a 0.1% level over a number of sequential treatments to a 100% level of the toxin.

Where substrates were employed which did not contain a natural carbon source, carbon was added by pretreatment of the substrate with a 1% solution of gluteraldehyde. The microorganism was then added to the substrate to form the microbial mat. Thereafter the substrate was flushed to remove non-attached microorganisms for maximizing active sites, and the substrate treated with solutions of the required nutrients, inclusive of the toxin, the toxin having been added in incrementally increasing concentrations to provide a new carbon source to which the microorganism adapted, and thrived thereupon. The substrate, with its glycocalyx microbial mat thus formed thereupon, and adapted to accept the toxin as a satisfactory source of carbon, was thus formed into a biocatalytic composition ready for use in the removal from toxin-contaminated streams of the toxins, on which it has learned to thrive.

The biocatalytic composition thus formed was then charged to a tubular reactor provided with an inlet and outlet. The biocatalytic composition was contained therein as a packed bed. Influents with varying types of toxins, in differing concentrations were then introduced into the reactor at differing void volumes and flow rates, with the results described in Table 3.

Referring specifically to Table 3, the first column identifies each of the microorganisms employed in the tests, the second column identifies the environmental source from which the miccroorganism was obtained, and the third column the isolation enrichment media employed to produce the biologically pure culture of the respective microorganism from which a biocatalytic composition was made by affixing the respective organism to a support. The fourth column of Table 3 identifies the toxicant of the toxicant-contaminated influent to the reactor. It will be observed that the toxicant employed in a given isolation-enrichment medium is similar to, or closely related to the toxicant, or toxicants found in the influent from which the toxicant is to be reduced, and destroyed. There is, as has been heretofore stressed, a relationship between the toxic contaminant, or contaminants, of the polluted source from which the microorganism was originally found, and cultivated, the toxin or toxins employed in the isolation-enrichment medium, and the toxin to be removed from the influent fed into the reactor. It has thus been observed that certain microorganisms, as is the subject of the present invention, survived the toxic pollutants to which they were exposed in nature, and then not only survived but thrived on further exposure to higher concentrations of similar toxins in the presence of a mutant, even to the extent that these microorganisms or mutants thereof accepted the toxin as a substitute carbon source.

In conducting the several runs, chitincoated Cellite was employed as the substrate, as given in Table 3 by reference to Column 5, Cellite is a registered trademark product of Manville, of Denver, Colorado; and, it it is made of rigid inorganic materials, predominantly silica, produced in several forms: powder, pellet and sphere. The Cellite employed in these runs were in the form of spheres, or beads. Column 6 gives the concentration of the toxin in the influent to the reactor, the concentration remaining essentially constant in most of the runs, but varying over a 10 ppm to 25 range in the second run. The concentration of the toxin in the effluent stream from the reactor, in ppm, is given in Column 7 along with the hydraulic retention time in hours. And finally, the void volume of the reactor is given in milliliters in Column 8, and also the flow rate in milliliters per minute of the stream input to the reactor.

TABLE 3

| Microorganism | Environmental Source | Isolation-Enrichment Media | Toxicants | Substrate(s) | Influent Toxicant Concentration, ppm | Effluent Toxicant Concentration, ppm [Hydraulic Retention Time] | Void Volume,/mL | Flow Rate mL/min |
|---|---|---|---|---|---|---|---|---|
| 1. Pseudomonas fluorescens PPr S-4-1 (ATCC SD 904) | Capital Lake, Baton Rouge, La. (fresh water lake) | Minimal Salt Solution and Aroclor TM[1] Mixture | PCB's and chorinated phenols | Chitin-coated Cellite[2] | 50 | 4.5-2.9 (±0.5) [36.2 hrs] | 117 mL/10 mL/min | |
| 2. Pseudomonas fluorescens Chemostat 5½ (ATCC SD 903) | Groundwater Sulfur, La. | Minimal Salt Solution and di-or tri chloroethane | Chlorinated ethanes di, tri | Chitin-coated Cellite[2] | 10-25 | 0.5 (±0.1) [6.1 hrs] | 117 mL/10 mL/min | |
| 3. Pseudomonas cepacia Sys 2A (ATCC SD 905) | Mississippi River Gulf Outlet, Shell Beach, La. | Minimal Salt Solution and Chlorinated phenol | phenols, pentachlorophenols, cresols | Chitin-coated Cellite[2] | 100 | 2.1 (±0.4) [8.9 hrs] | 220 mL/10 mL/min | |
| 4. Methylobacter rhodinum SC 971-Red (ATCC 113-X) | Activated Charcoal, Waste Treatment Unit St. Gabriel, La. | Minimal Salt Solution and 50 ppm triazine | triazine herbacides, triazine homologues, triazine ring compounds, RDX compounds | Chitin-coated Cellite[2] | 50 | 12 [1240 hrs] | 170 mL/1 mL/min | |
| 5. Methylobacter species SC 971-White (ATCC 138-X) | Activated Charcoal, Waste Treatment Unit St. Gabriel, La. | Minimal Salt Solution and 50 ppm triazine | triazine herbacides, triazine homologues, triazine ring compounds, RDX compounds (1,3,5-trinitro-1,3,5-triazine) | Chitin-coated Cellite[2] | 50 | 12 [1240 hrs] | 170 mL/1 mL/min | |

Note[1] Aroclor TM is a commercial mixture of Aroclor 1232, Aroclor 1248, and Aroclor 1254 obtained from Foxboro Analabs. These isomer/cogenor mixtures represent an adequate sampling of the possible 209 PCB combinations, including specifically 4,4' dichlorobiphenyl (4,4' DCB), 2,5,4' trichlorobiphenyl (2,5,4' TCB) and 2,4,5,2',5' pentachlorobiphenyl (2,4,5,2',5' PCB).

Note[2] Cellite, a registered trademark of Manville. A rigid inorganic catalyst carrier, principally of silicous matter. Cellite employed was Cellite R-630 spheres.

These data clearly show that the biocatalytic compositions, which contain immobilized whole cells of the microorganisms of this invention, are admirably efficient in time in completing the biotransformation of the toxicants, and provide a final effluent containing only minimal levels of the toxicants. The *Pseudomonas fluorescens* PPr S-4-1 (ATCC SD 904) created to have a genetic predisposition to utilize PCB's as its carbon source effectively lowers the level of PCB's and chlorinated phenols from 50 ppm to between 2.9 ppm and 4.5 ppm with a hydraulic retention time of only 36.2 hours. The *Pseudomonas fluorescens* Chemostat 5 ½ (ATCC SD 903) reduces the level of chloroethanes from a 10 ppm to 25 ppm to only 0.5 ppm with a hydraulic retention time of only 6.1 hours. The *Pseudomonas cepacia* Sys 2A (ATCC SD 905) reduces the level of phenolic compounds from an influent concentration of 100 ppm to a level of 2.1 ppm with a hydraulic retention time of only 8.9 hours. The two Methylobacter microorganisms, i.e., *Methylobacter rhodinum* SC 971-Red (ATCC 113-X) and Methylobacter species S 971-White (ATCC 138-X), reduce the 50 ppm level of triazine herbacides contained in the influent to 12 ppm with a hydraulic retention time of 1250 hours. Multiple toxic presence does not appear to adversely affect the performance of the respective biocatalytic compositions. The treatments render the hazardous materials virtually harmless.

The solid substrate to which the microorganisms of this invention are attached is porous, and preferably of pore volume of at least 0.2 microns/gram of solids material. Preferably, the pore volume ranges from about 0.2 microns/gram to about 45 microns/gram, more preferably from about 5 microns/gram to about 15 microns/gram of solids material. Particle sizes range generally from about 0.5 millimeters (mm) to about 2.0 mm, preferably from about 0.75 mm to about 1.0 mm, in diameter. A substrate shaped as a hollow tube, or as a cylinder provides a support suitable for many uses. The tube or cylinder can be of virtually any length, with the diameters of such tubular specimens ranging generally from about 30 cm to about 300 cm, preferably from about 75 cm to about 125 cm. Biocatalysts formed on such substrates an be employed as fixed beds or moving beds, generally the former. The biocatalyst particles are sized in accordance with accepted engineering principles to provide good contact between the effluent and the biocatalytic particles.

Solid surfaces to which the microorganisms can be affixed are, preferably an aminopolysaccharide surface such as chitan, chitosan, n-carboxy chitosan, cellulose, or a porous inorganic oxide such as alumina, silica, silica-alumina, clay, diatomaceous earth or the like. A preferred support is one wherein the chitin, or chitosan is dispersed upon a second solid support, e.g., a porous inorganic oxide. The classes of useful porous inorganic oxides is quite large, exemplary of which are, e.g., (1) silica or silica gel, clays, and silicates including tose synthetically prepared and naturally occurring, which may or may not be acid treated, for example, attapulgus clay, china clay, diatomaceous earth, fuller's earth, kaolin, kieselguhr, etc.; (2) ceramics, porcelain, crushed firebrick, bauxite; (3) synthetic and naturally occurring refractory inorganic oxides such as alumina, titanium dioxide, zirconium dioxide, chromium oxide, zinc oxide, magnesia, thoria, boria, silica-alumina, silica-magnesia, chromia-alumina, alumina-boria, silica-zirconia, silica carbide, boron nitride, etc.; (4) crystalline zeolitic aluminosilicates such as naturally occurring or synthetically prepared mordenite and/or faujasite, either in the hydrogen form or in a form which has been treated the multavalent cations; (5) spinels such as $MgAl_2O_4$, $FeAl_2O_4$, $ZnAl_2O_4$, $MnAl_2O_4$, $CaAl_2O_4$ like compounds having the formula $MO.Al_2O_3$ where M is a metal having a valence of 2; and (6) combinations of elements from one or more of these groups.

The solid support surface to which the microorganism can be affixed can be used advantageously in the method of this invention in any configuration, shape, or size which exposes a catalytically available amount of the microorganism disposed thereon to the effluent to be treated. The choice of configuration, shape, and size of the refractory inorganic oxide depends on the particular circumstances of use of the method of this invention. Generally, in operations in which the biocatalytic composite is disposed as a fixed bed in an immobile vessel, the support surface can be conveniently employed in particulate form, as pills, pellets, granules, rings, spheres, rods, hollow tubes, etc. Exemplary of preferred materials of hollow tubular shape are, e.g., Amicon's ultrafiltration membranes cast from a variety of polymer solutions, these consisting of membranes of a very thin (0.1 to 1.5 m), dense "skin" of extremely fine, controlled pore structure which opens to a much thicker (50 to 250 m), open-celled spongy layer of the same polymer, e.g., polysulfone or acrylic copolymers. A particulate support form is especially desirable for large volumes of the catalytic composite, and for use in circumstances in which periodic replacement of the biocatalytic composite may be desired.

Various organic compounds, aldehydes, ketones, acids and the like are suitable for pretreatment and impregnation of a substrate to modify same, and provide a carbon source thereupon or within the substrate to which the microorganisms of this invention can attach, reproduce and grow. Chitin, chitosan and cellulose per se contain carbon, and when treated with the organic compound both the organic compound and the chitin, chitosan or cellulose constitute a carbon source for the microorganisms. The organic compounds, e.g., aldehydes ketones, or acids are applied to the substrate as solutions, generally aqueous solutions, containing from about 0.1 to about 5 percent, preferably from about 0.5 to about 2 percent, of the organic compound, based on the weight of the solution. Exemplary of the aldehydes useful as a carbon applied to a non-carbonaceous substrate are those characterized by the formula $R-C-H=O$ wherein R is H, alkyl, alkenyl, alkynyl, aryl, alkaryl, arylalkyl, or the like, e.g., acetaldehyde, butyaldehyde, heptaldehyde, phenylacetaldehyde, o-tolualdehyde, p-hydroxybenzaldehyde; whether saturated or unsaturated, e.g., crotonaldehyde; and including dialdehydes, e.g., glutaraldehyde; trialdehydes, e.g., 4-formylbutanoic acid, cyclopentanecarbaldehyde and the like. Exemplary ketones are those characterized by the formula $R-R(o)R^1$ wherein R and $R^1$ can be the same or different, and selected from H, alkyl, alkenyl, alkynyl, aryl, alkaryl, arylalkyl groups and the like, e.g., acetone, ethyl propyl ketone, methyl isopropyl ketone, methyl heptyle ketone, methyl vinyl ketone; and ketenes such as dimethylketene, diphenylketene and the like. Exemplary of the organic acids are e.g., formic acid, acetic acid, butyric acid, capric acid, propiolic acid, cyclobutanecarboxylic acid trimellitic acid, and the like. The chitin, chitosan or cellulose substrates are suitably partly digested with the organic compound, in solution, to form a polysaccharide coating by chemical modification of the beta linkages. The non-carbon substrates, e.g., a diatomaceous earth or porous inorganic oxide, are impregnated and coated by such solutions to form a carbon veneer, coating or carbon sites to which the microorganisms become attached. Such treatment with the solution of the carbon compound is generally continued over a period ranging from about 1 to about 48 hours, preferably from about 12 to about 24 hours. The microorganism of choise is then contacted with the pretreated substrate by contact therewith of a solution containing the microorganism of choice, to which is added nitrogen, phosphorus, and minerals, at conditions favoring optimum growth of the organism. Generally, the contact of the solution with the substrate is continued over a period ranging from about 8 hours to about 96 hours, preferably from about 24 hours to about 48 hours. A preferred method for adding the microorganisms to the pretreated substrate, or substrate containing the carbon sites, is to continously recycle the solution containing the selected microorganism over said pretreated substrate. The microorganisms are reproduced, and grow, attaching themselves onto the substrate, becoming matted with the substrate. After formation of the microbial mat the system is generally flushed with water to remove nonattached microorganisms, this exposing and maximizing the active sites on said biocatalytic substrate. The biocatalyst composition, once formed by affixing the microorganism to the substrate, can be used immediately for detoxification of an effluent containing the toxic substance used for the separation, purification and growth of the respective microorganism, or dried, stored and then reactivated by the addition thereto of a liquid media compatible with the microorganism.

Various toxicants can be added to soil samples, or sediments, to produce cultures of a microorganism which, when subsequently separated from its natural environment, purified, genetically modified and affixed to a substrate as herein described will form a biocatalyst effective for the detoxification of an effluent containing the toxicant originally used for the production and growth of said microorganism. Organochlorides, e.g., benzenehexachloride (BHC), can be used to treat a soil from which cultures of BHC-resistant microorganisms can be reproduced, grown, affixed to a substrate, and the substrate containing the BHC-resistant microorganisms then employed as a biocatalyst to detoxify BHC-containing effluents. Organophenols, e.g., phenol, can be used to treat a soil, or sediment from which cultures of phenol-resistant microorganisms can be reproduced, grown and affixed to a substrate, and the substrate containing the phenol-resistant microorganisms then employed as a biocatalyst to detoxify phenol-containing effluents. The same is true for other organophenols, e.g., 2-chlorophenol, 4-nitrophenol and the like. Organophosphates, e.g., methyl parathion and azinphosmethyl, can also be used for the production from a soil, or sediment, of such microorganisms, the microorganisms then attached to a substrate to form a biocatalyst, and the biocatalyst then employed for the detoxification of an effluent containing such toxicant.

It is apparent that various modifications can be made as will be known to those skilled in this art, without departing the spirit and scope of the invention.

Having described the invention, what is claimed is:

I claim:

1. A biologically pure culture of a microorganism selected from the group consisting of *Methylobacter rhodinum* ATCC 113-X and Methylobacter species ATCC 138-X.

2. As a composition of matter, a biocatalyst which comprises
   a particulate solid substrate to which is affixed a biologically pure culture of a microorganism selected from the group consisting of *Methylobacter rhodium* ATCC 113-X and Methylobacter species ATCC 138-X.

3. The composition of claim 2 wherein the particulate substrate to which a microorganism is affixed is selected from the group consisting of Chitan, Chitosan, N-Carboxy Chitosan, cellulose, diatomaceous earth, and porous inorganic oxides.

4. The composition of claim 3 wherein the particulate substrate to which a microorganism is affixed is in the shape of granules, rings, spheres, rods and hollow tubes.

5. The composition of claim 3 wherein the particulate substrate to which a microorganism is affixed is in the shape of a hollow tube, and constituted of a membrane formed from a polymer solution.

6. A process for the separation from a toxin-contaminated soil, or sediment of a natural environment a mutant microorganism suitable for affixing to a substrate to form a biocatalyst composition, which comprises:
   obtaining said toxin-contaminated soil, or sediment, from said natural environment,
   isolating a mixed colony of microorganisms from said toxin-contaminated soil, or sediment, colonizing said microorganisms on an agar medium while subjecting said microorganisms to increasing concentrations of a toxin analogous or identical to that to which the colony or microorganisms was originally exposed, in the presence of a mutating agent,
   separating live microorganisms from microorganisms that are killed, and continuing to colonize said live microorganisms while repeatedly subjecting the surviving microorganisms to continued increasing concentrations of said toxin, in the continued presence of a mutating agent, while forcing surviving microorganisms to accept the toxin as a substitute carbon source, until such time that a biologically pure culture of a surviving mutant microorganism, identified as a microorganism selected from the group consisting of *Methylobacter rhodinum* ATCC 113-X and Methylobacter species ATCC 138-X will accept the toxin as a source of carbon.

7. The process of claim 6 further comprising
   placing said mutant microorganism and solids in a microcosm,
   supplying growth factors and toxin as a source of carbon to said microorganism, and growing the microorganism whereby the microorganism becomes affixed to the solids to form a biocatalytic composition.

8. The process of claim 7 wherein the solids are of particulate form, and porous.

9. The process of claim 8 wherein the particulate solids range in diameter from about 0.5 mm to about 2.0 mm, and the pore volume from about 0.2 microns/gram to about 45 microns/gram.

* * * * *